Patented Nov. 10, 1925.

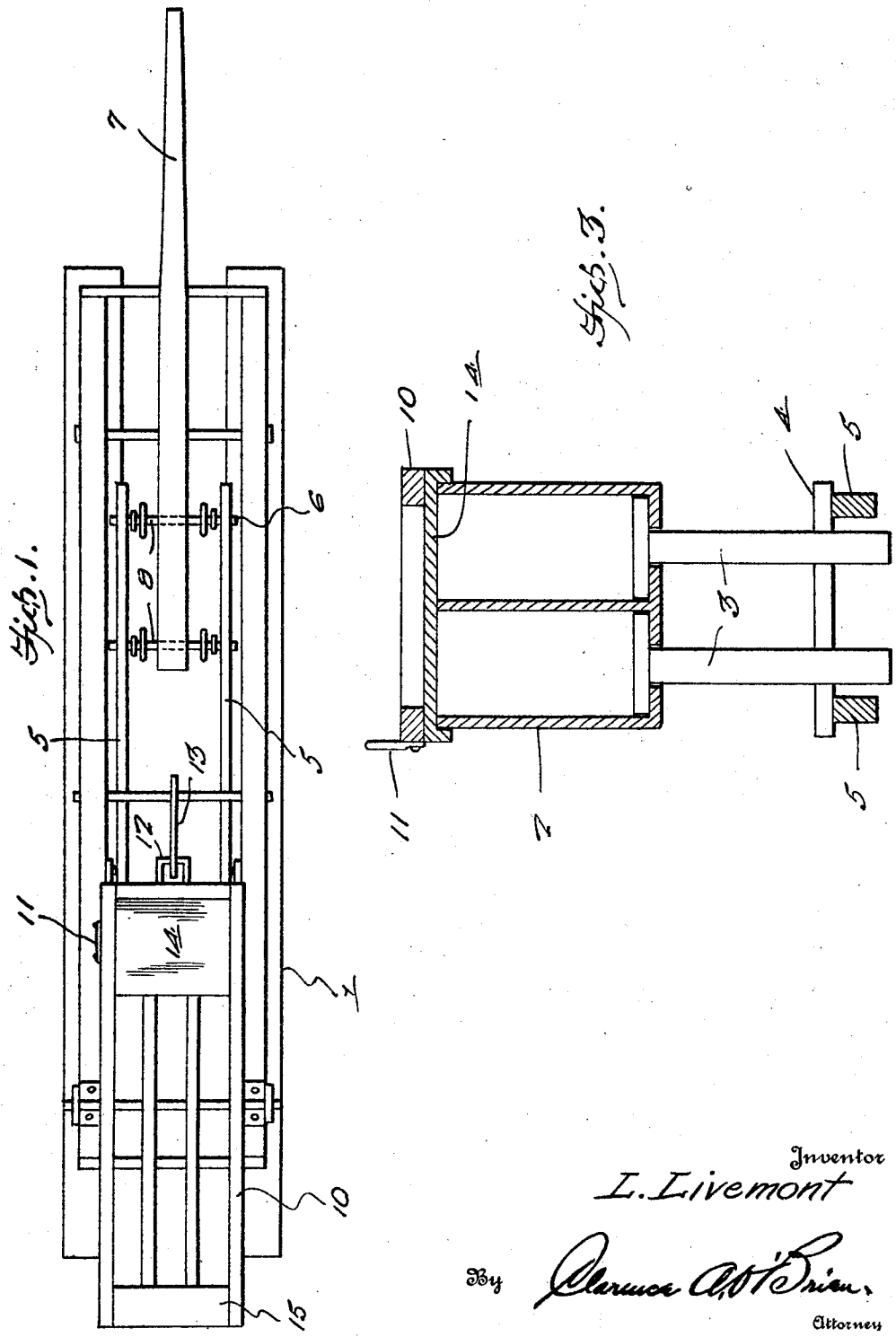

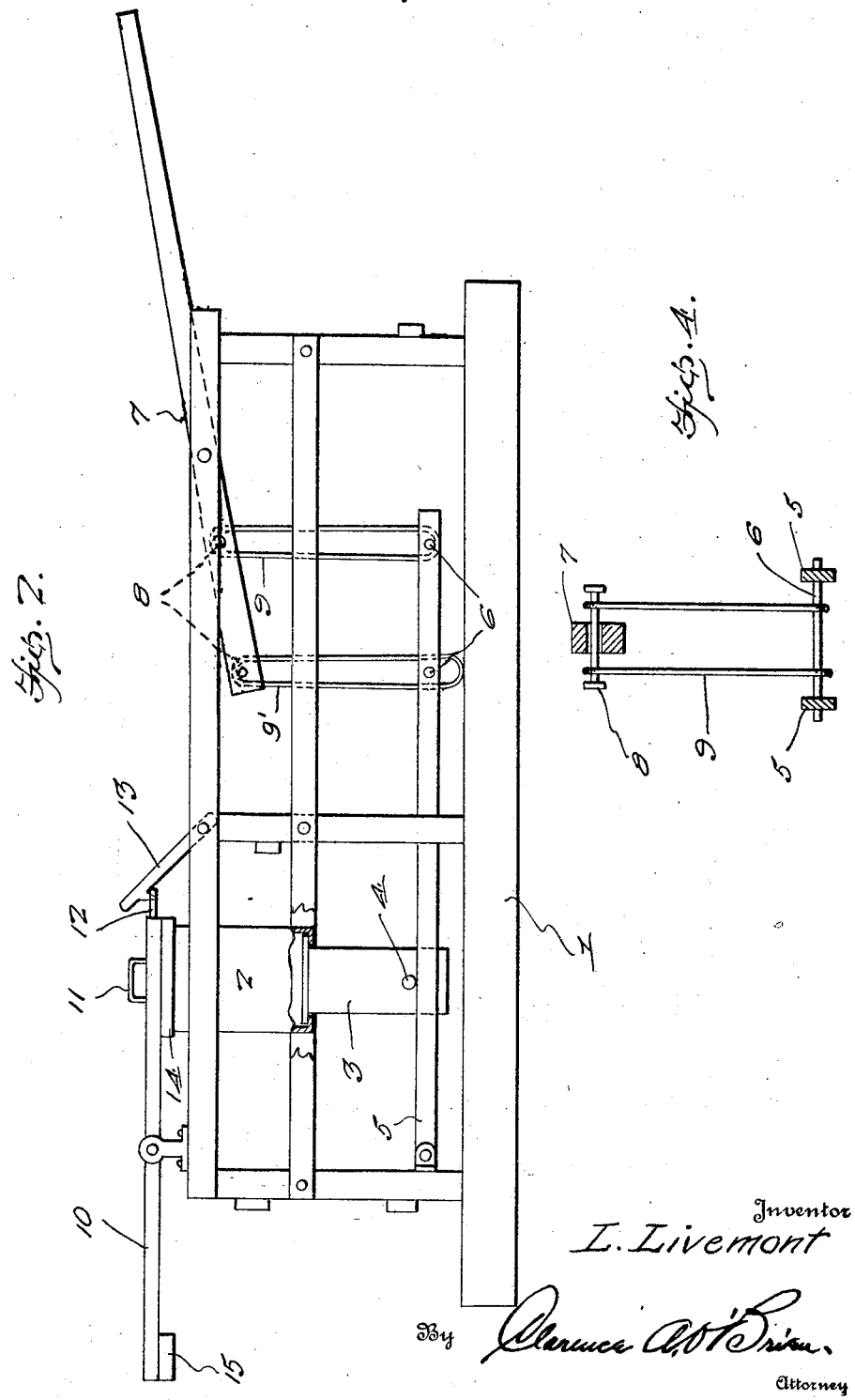

1,561,257

UNITED STATES PATENT OFFICE.

LEON LIVEMONT, OF NEW EAGLE, PENNSYLVANIA.

MOLDING APPARATUS.

Application filed May 17, 1924. Serial No. 714,050.

*To all whom it may concern:*

Be it known that I, LEON LIVEMONT, a citizen of the United States, residing at New Eagle, in the county of Washington and State of Pennsylvania, have invented certain new and useful Improvements in Molding Apparatus, of which the following is a specification.

This invention relates to brick molding apparatus and it consists in the novel features hereinafter described and claimed.

An object of the invention is to provide apparatus of simple and durable form, adapted to be easily and conveniently used by a single operator for pressing material into the form of brick, and which includes a series of molds mounted upon a frame, with a plunger slidably mounted upon in each mold. Levers are fulcrumed to the frame, and are adapted to move the plunger, and a manually operable lever is fulcrumed upon the frame, and is operatively connected with the first mentioned levers whereby a compound lever structure is provided. Counter balanced mold covers are pivoted upon the frame, and means are provided for locking the said covers in position over the bodies of the molds. After the material has been compressed in brick form, the mold covers may be swung from over the bodies of the molds and the said lever mechanism hereinbefore referred to, may be used for lifting the bricks above the upper edges of the mold bodies in order that they may be conveniently removed from the apparatus.

In the accompanying drawings,

Figure 1 is a top plan view of the brick molding apparatus.

Figure 2 is a side elevational view of the same.

Figure 3 is a transverse sectional view of the same, cut through the mold bodies of the apparatus.

Figure 4 is a transverse sectional view of the apparatus, cut through the compound lever mechanism thereof.

The apparatus for molding brick comprises a frame 1, upon which is mounted a pair of mold bodies 2. Plungers 3 are slidably mounted in the mold bodies 2, and the stems of the said plungers pass through the bottom wall of the said body. A cross shaft 4 is carried at the lower end portions of the stems of the plungers 3. Levers 5 are fulcrumed at one end to the frame 1, in the vicinity of the end thereof, and the upper edges of the levers 5 engage under the end portions of the cross shaft 4. The forward portions of the levers 5 are connected together by cross rods 6, which are spaced from each other. A lever 7 is fulcrumed upon the frame 1, in the vicinity of the corner thereof, which is diagonally disposed with relation to that corner portion at which the levers 5 are fulcrumed. Cross pins 8 are carried by the lever 7, and elongated links 9 and 9' pass around the cross pins 8 and the rods 6, and are substantially vertically disposed as best indicated in Figure 2 of the drawings. Bars 10 are pivoted at points between their ends upon the upper portion of the frame 1, and one of the said bars 10 is provided with a handle 11. A loop 12 is connected with the free end portions of the bar 10, and a catch member 13 is pivoted upon the frame 1, and is adapted to engage over the loop 12. Mold body closures or covers 14 are carried at the under side of the bars 10, and are adapted to close the upper end of the mold body 2. A counter-balance weight 15 is carried at the opposite end portions of the bars 10, from the ends thereof, upon which the cover 14 is mounted.

The apparatus is operated as follows:

The plungers 3 are lowered in the mold bodies 4, until they rest upon the bottoms of the said bodies. The materials of which the bricks are to be formed, is then filled into the bodies 2, and the cover 14 is lowered down over the mold body, and secured by engaging the catch 13, over the loop 12. The artisan then presses down upon the outer end of the lever 7, whereby the links 9 and 9' are moved in an upward direction, and the inner ends of the levers 5 are elevated. The said levers carry the cross shaft 4 and the plungers 3 up with them, and the material within the mold body 2 is compressed within the said bodies and against the under side of the closure 14. When sufficient compression has been imparted to the material, the catch member 13 is disengaged from the loop 12 and the bars 10 are swung whereby the closure 14 is removed from over the mold bodies 2. The artisan then further depresses the outer end of the lever 7, whereby the plungers 3 are moved to the upper edges of the mold bodies 2 and the formed bricks are positioned above the upper edges of the mold bodies and may be readily removed from the apparatus.

When the lever 7 is initially swung, the link 9 operates the levers 5, and starts the plunger 3, thus utilizing a relatively long leverage to overcome the initial inertia and complete the compression of the bricks. After compression is completed, the link 9' takes up the connection between the lever 7 and the levers 5 thereby shortening the leverage so as to quicken the speed of the plunger 3, thereby causing the bricks to be ejected with a relatively short swing of the lever 7 after the closures 14 have been removed from the mold body.

Having described the invention, what is claimed is:

1. Apparatus for molding bricks comprising a frame, a mold body mounted thereon, a plunger mounted for movement in the mold body and having its stem projecting through the bottom of the body, a cross shaft passing through the stem of the plunger, levers fulcrumed on the bottom of the frame and having their upper edges engaging the cross shaft, a manually operable lever fulcrumed on the top of the frame, and a pair of links operatively connecting the manually operable lever with the first mentioned levers and longitudinally spaced in respect to the levers.

2. An apparatus of the class described for molding bricks and the like comprising a frame, a mold body mounted on the frame, a plunger mounted for movement in the mold body, a lever of the second order pivoted on the frame and having its intermediate portion engageable with the plunger, a lever of the first order pivotally mounted intermediate its ends on the frame, a pair of links pivoted to the lever of the first order in spaced relation, pins extending from the lever of the second order and longitudinally spaced from each other for receiving the links, all in the manner and for the purpose specified.

In testimony whereof I affix my signature.

LEON LIVEMONT.